United States Patent [19]
Saito

[11] Patent Number: 5,138,466
[45] Date of Patent: Aug. 11, 1992

[54] FACSIMILE APPARATUS

[75] Inventor: Hirohisa Saito, Atsugi, Japan

[73] Assignee: Ricoh Company, Ltd., Tokyo, Japan

[21] Appl. No.: 642,201

[22] Filed: Jan. 16, 1991

[30] Foreign Application Priority Data

Jan. 18, 1990 [JP] Japan ..................................... 2-7146

[51] Int. Cl.5 .............................................. H04N 1/00
[52] U.S. Cl. ..................................... 358/468; 358/435
[58] Field of Search .................... 358/468, 434–436, 358/400, 402, 403, 405, 409, 442

[56] References Cited

U.S. PATENT DOCUMENTS

| | | | |
|---|---|---|---|
| 4,829,559 | 5/1989 | Izawa et al. | 358/468 |
| 4,994,926 | 2/1991 | Gordon et al. | 358/435 |
| 5,041,915 | 8/1991 | Hirota et al. | 358/400 |
| 5,068,888 | 11/1991 | Scherk et al. | 358/435 |

Primary Examiner—Stephen Brinich
Attorney, Agent, or Firm—Oblon, Spivak, McClelland, Maier & Neustadt

[57] ABSTRACT

A facsimile apparatus processes a predetermined signal from a second external apparatus by means of correlating a first external apparatus with the second external apparatus if the facsimile apparatus is communicating with the first external apparatus when the second external apparatus transmits the predetermined signal to the facsimile apparatus. The signal is used for the operative connection between the facsimile apparatus and the second external apparatus. According to the present invention, the second external apparatus is prevented from frequently transmitting the predetermined signal to the facsimile apparatus. The present invention is applicable to a facsimile apparatus used for an integrated digital network.

22 Claims, 13 Drawing Sheets

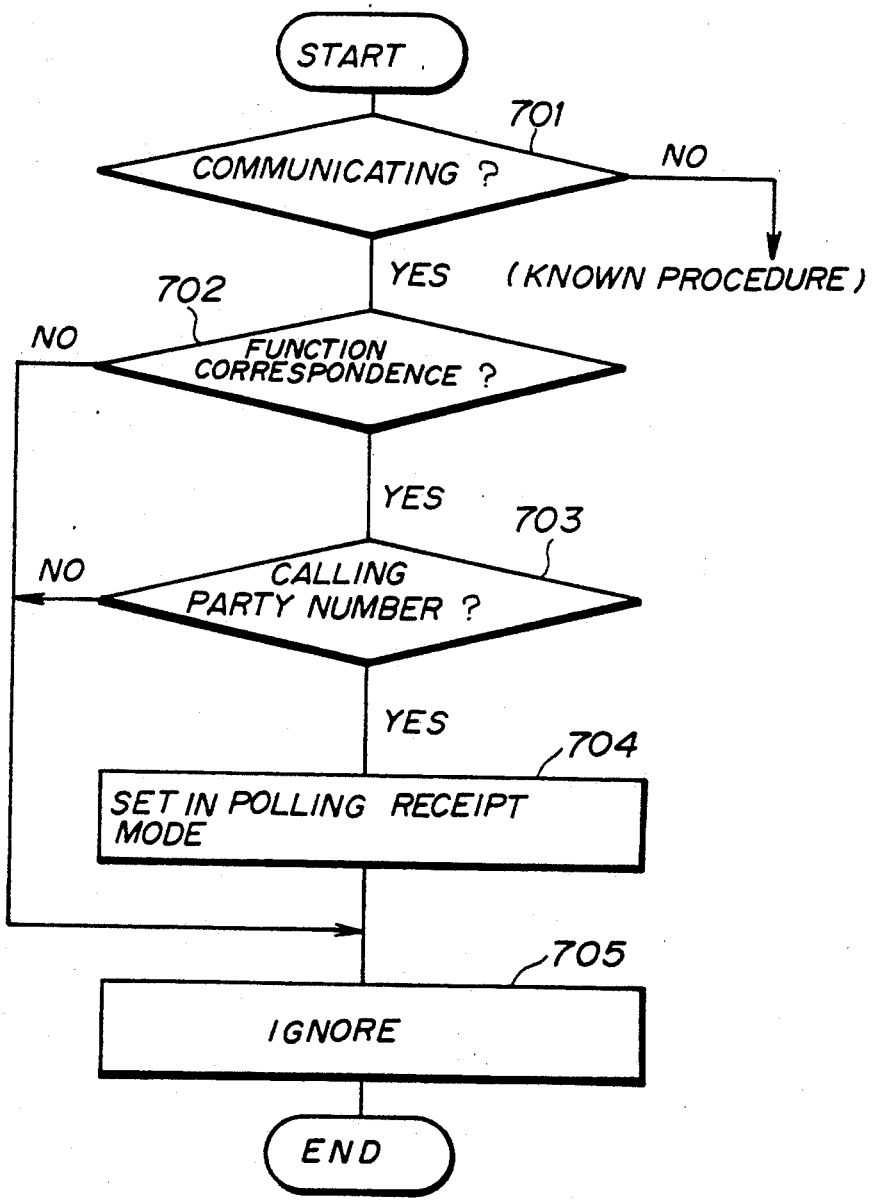

FACSIMILE APPARATUS

BACKGROUND OF THE INVENTION

The present invention relates generally to facsimile apparatuses, and more particularly to a facsimile apparatus used for an integrated digital network (called ISDN for short).

With the recent advances in ISDN construction, facsimile apparatuses used for the ISDN have been accordingly developed. The ISDN is supposed to replace the public services telephone network (called PSTN for short), however, until this actually happens, it is necessary to reconcile the use of the ISDN with that of the PSTN, and thus information must be transmitted between a terminal of the ISDN and that of the PSTN. Hereupon, a facsimile apparatus has been developed to serve as a group 4 facsimile apparatus, which is mainly used for the ISDN, and a group 3 facsimile apparatus, which is mainly used for the PSTN. These facsimile apparatuses use multichannel basic interfaces for the ISDN, such as two data channels (called B-channels hereinafter) and a one signal channel (called D-channel hereinafter). The B-channels are mainly used for data transmission, and the D-channel is mainly used for a call control. Therefore, a data transmission through one of the B-channels can take place almost simultaneously with a call accepted through the D-channel. And the B-channels are usually controlled by a single transmission controller so that the data transmission through one B-channel cannot take place simultaneously with data transmission from the other B-channel. Additionally, a facsimile apparatus ignores or rejects an incoming call based on an outgoing call from a terminal while it is communicating with another terminal since one of the B-channels is being used. Consequently, the terminal transmits the same outgoing call to the facsimile apparatus after the communicating is finished. Therefore, the outgoing call must be unnecessarily repeated. On the other hand, a facsimile apparatus which can control both B-channels simultaneously is expensive.

SUMMARY OF THE INVENTION

Accordingly, it is a general object of the present invention to provide a facsimile apparatus in which the above disadvantages are eliminated.

Another object of the present invention is to provide an inexpensive facsimile apparatus in which unnecessary outgoing calls are prevented.

The more specific object of the present invention is to provide a facsimile apparatus for transmitting information to an external apparatus and/or receiving information therefrom via a transmission line, the information comprising first information and second information, the first information comprising image data, the second information comprising control information by which the facsimile apparatus is connected with the external apparatus, the transmission line comprising a plurality of first channels through one of which the first information is transmitted, and at least one second channel through which the second information is transmitted, each of the first channels being connectable to the facsimile apparatus and/or the external apparatus, the first information being incapable of being transmitted simultaneously via more than two channels from among the first channels between the facsimile apparatus and the external apparatus, however more than two channels therefrom being simultaneously connectable to the facsimile apparatus and the external apparatus, and the second channel being operatively connectable to the facsimile apparatus and/or the external apparatus, which facsimile apparatus comprises scanning means for scanning a predetermined manuscript so as to generate the image data appropriate to the predetermined manuscript, an interface operatively connectable to the transmission line, memory, responsive to the scanning means and interface, for storing the first information therein, first control means, coupled to the interface and memory, for controlling transmitting and/or receiving of the first information via one of the first channels, second control means, coupled to the interface, for controlling transmitting and/or receiving of the second information via the second channel, third control means, responsive to the first and second control means, for controlling the first and second control means, the third control means including first judging means for judging whether or not the first information is being transmitted between the facsimile apparatus and a first external apparatus when the second control means receives the second information from a second external apparatus, and processing means, responsive to the first judging means, for processing the second information from the second external apparatus by means of correlating the first external apparatus with the second external apparatus so that the second external apparatus is prevented from frequently transmitting the second information to the facsimile apparatus, the processing means processing only if the first judging means judges the first information is being transmitted between the facsimile apparatus and the first external apparatus, and plotter means, responsive to the second control means, for plotting an image appropriate to image information which the first control means receives from the external apparatus.

According to the present invention, because of the processing means of the third control means, the second external apparatus is prevented from transmitting the second information many times without the need to make the facsimile apparatus very expensive.

Other objects and further features of the present invention will become apparent from the following detailed description when read in conjunction with the accompanying drawings.

BRIEF DESCRIPTION OF THE DRAWINGS

FIGS. 13 to 15 show procedures executed by a controller in accordance with the time chart shown in FIG. 12;

DESCRIPTION OF THE PREFERRED EMBODIMENTS

Figure 1:
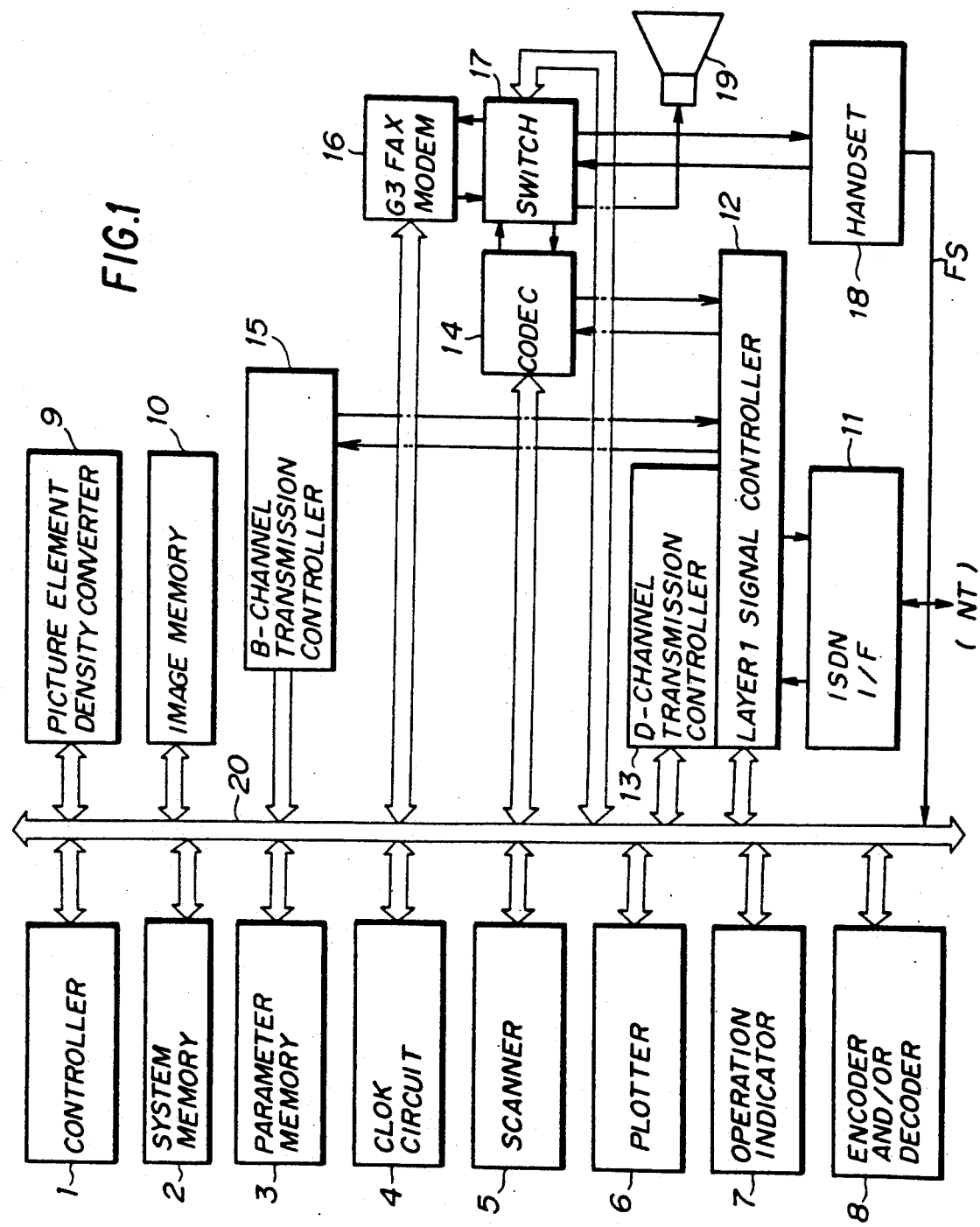
FIG. 1 is a facsimile apparatus according to the present invention.

A facsimile apparatus (called FAX for short) shown in FIG. 1 serves as a group 4 facsimile apparatus (called G4 FAX for short), a group 3 facsimile apparatus (called G3 FAX for short), and a telephone. The FAX is used for the ISDN. However, the FAX has a single transmission controller so that, as mentioned above, data transmission concerning the G3 FAX cannot take place simultaneously with that concerning the G4 FAX.

A controller 1 controls the general operation of each part of the FAX, transmission procedures of the G3 FAX and the G4 FAX, and a telephone procedure. A system memory 2 stores some programs used for the above procedures and various information required for executing the above programs therein. The system memory 2 functions as a working area of the controller 1. A parameter memory 3, comprising a static random access memory (called SRAM for short), stores various items of information peculiar to the FAX. A clock circuit 4 gives the present time. A scanner 5 scans a predetermined image with a predetermined resolution. A plotter 6 outputs the predetermined image with a resolution established by the G4 FAX. An operation indicator 7, comprising various operation keys and indicators, indicates the operation of the FAX. An encoder and/or decoder 8 encodes image signals to form compressed image data and/or decodes the compressed image data to form the image signals. A picture element (called pixel for short) density converter 9 converts the pixel density so as to make the pixel density of images equal between this FAX and a communicatee terminal.

An image memory 10 stores various information, such as transmission image signals and transmission image data. An ISDN interface circuit 11 connects the FAX to the ISDN. A layer 1 signal controller 12 functions as a signal processor of the layer 1, and combines and/or separates signals from a D-channel and B-channels. A D-channel transmission controller 13 performs outgoing and/or incoming call control procedures. Additionally, the D-channel transmission controller 13 transmits the presence of a call establishment to the controller 1. A CODEC 14 functions as an A/D converter. A B-channel transmission controller 15 executes transmission control procedures of layers 2, 3, 4, and 5. If the D-channel transmission controller 13 transmits the presence of the call establishment to the controller 1, the controller 1 instructs the B-channel transmission controller 15 to executes one of the transmission control procedures.

A G3 FAX modem 16 has a low speed modem function (V.21 modem) used for transmission procedure signals and a high speed modem function (V.29 modem, V.27 the modem) mainly used for image data. The switch 17 connects the CODEC 14 to the G3 FAX modem 16, a handset 18 used for a call, and speaker 19 outputting a calling tone (called CNG for short) 18. The controller 1, system memory 2, parameter memory 3, clock circuit 4, scanner 5, plotter 6, operation indicator 7, encoder and/or decoder 8, pixel converter 9, image memory 10, layer 1 signal controller 12, D-channel transmission controller 13, CODEC 14, B-channel transmission controller 15, G3 FAX modem 16 and switch 17 are coupled to the inside bus 20, respectively, so as to be connected with one another. Incidentally, hook signal FS indicating a hook state of the handset 18 is applied to the controller 1 via the inside bus 20.

Figure 2:
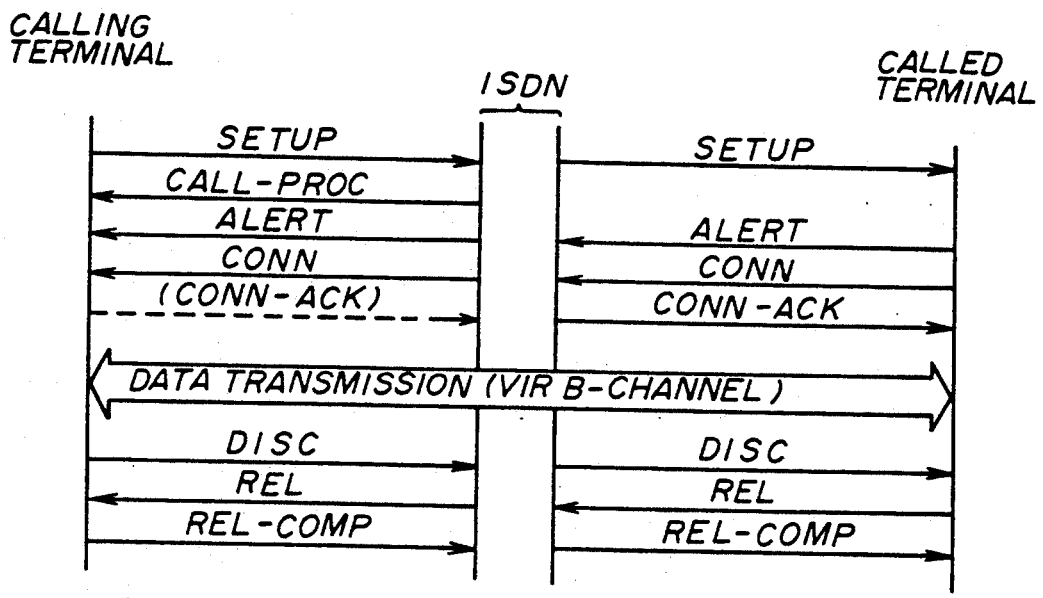
FIG. 2 shows a time chart explaining a general circuit-switched connection control procedure regarding an ISDN.

FIG. 2 shows a time chart for explaining a general circuit-switched connection control procedure regarding the ISDN. At first, a terminal, a calling terminal, establishes a line switching mode concerning a transmission mode. Subsequently, the terminal transmits a setup message (called SETUP for short) to the ISDN which designates a predetermined called terminal. The SETUP indicates the requirement of the setup with the called terminal. In response, the ISDN transmits the SETUP to the predetermined called terminal so as to transmit an outgoing call. The ISDN transmits a call proceeding message (called CALL PROC for short), which indicates the setup proceeding, to the calling terminal. On the other hand, the called terminal generally transmits an alerting message (called ALERT for short) to the ISDN in response to the incoming call. The ISDN transmits the ALERT to the calling terminal so as to inform the FAX about the alert starting of the called terminal. Subsequently, the called terminal transmits a connect message (called CONN for short) to the ISDN, and the ISDN transmits the CONN to the calling terminal so as to inform the FAX about the call proceeding of the called terminal. The ISDN transmits a connect acknowledge message (called CONN ACK for short) to the called terminal so that one of the B-channels used for various data transmissions is established between the calling and called terminals. After a predetermined data transmission, the calling terminal transmits a disconnect message (called DISC for short) to the ISDN, and the ISDN transmits the DISC to the called terminal so as to inform the FAX about the clearing of the B-channels. The called terminal transmits to the ISDN a release message (called REL for short) for clearing the B-channels. In response, the ISDN transmits the REL to the calling terminal. At last, the calling terminal transmits a release complete message (called REL COMP for short) to the ISDN, and the ISDN transmits the REL COMP to the called terminal. Consequently, one of the B-channels between the calling and called terminals is released completely.

Figure 3A:
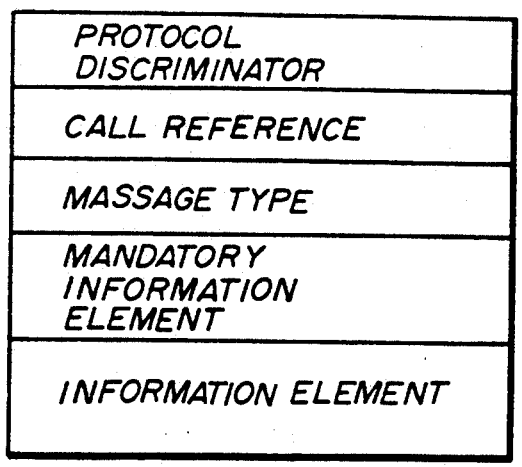
FIG. 3(a) shows general items of a setup message.

The SETUP of the ISDN comprises, as shown in FIG. 3(a), a protocol discriminator, a call reference, a message type, a mandatory information element, and an information element. The protocol discriminator discriminates the protocol recommendations of the layer 3 call control message, such as a format and a sequence. The call reference discriminates which call the message relates to. The message type discriminates the content of each message. The mandatory information element is always part of each message. The information element is part of each message only when necessary. The number of the mandatory information elements is established in accordance with the message type, and the number of the information elements is established in accordance with the number of the mandatory information elements.

Figure 3B:
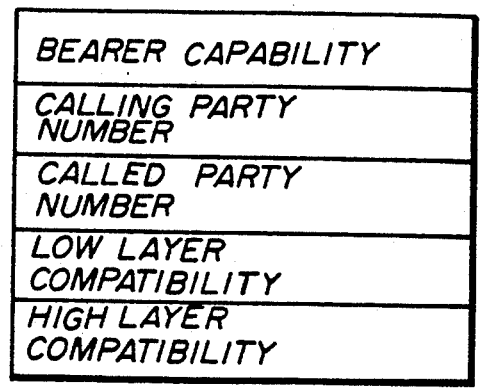
FIG. 3(b) shows general data elements of the setup message shown in FIG. 3(b)

The SETUP also comprises, as shown in FIG. 3(b), a bearer capability, a calling party number, a called party number, a low layer compatibility, and a high layer compatibility. The bearer capability is a mandatory information element, and other elements belong to information elements. The bearer capability comprises an information transfer capability, a transfer mode, and a information transfer rate. The information transfer capability indicates the content of data to be transmitted, such as speech, unrestricted digital data, restricted digital data, 3.1 kHz audio, 7 kHz audio, and video. The transfer mode indicates whether a circuit switching or a packet switching is used. The bearer capability further comprises transfer type data and protocol data for users. The calling party number indicates an ISDN number of the calling terminal, and the called party number indicates that of the called terminal. The low layer compatibility, whose function is basically the same as that of the bearer capability, is mainly used for a communication test between the calling terminal and the called terminal. The high layer compatibility mainly used for the compatibility test therebetween, for example, the type of a terminal, such as a group 2/group 3 FAX, a G4 FAX, a mix mode, a teletex, a videotex, a telex, and message handling system, is indicated.

Figure 4:
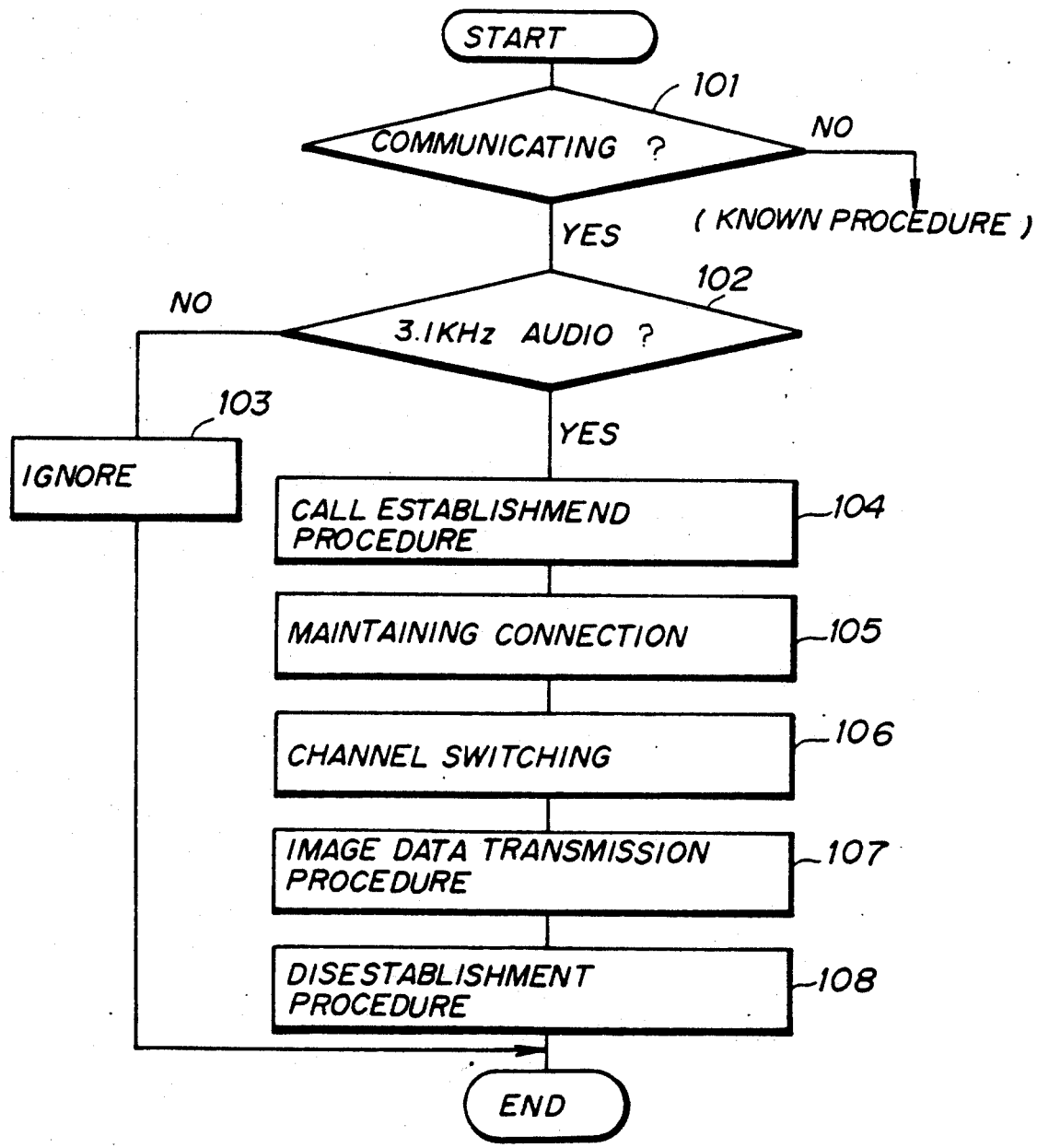
FIG. 4 shows a procedure executed by a controller of a first embodiment according to the present invention.

The controller 1 according to the present invention executes a procedure in response to the SETUP, as shown in FIG. 4. The controller 1 according to the present invention adequately solves a case where, while the FAX (named Ta hereinafter) is communicating with one terminal (named Tb hereinafter), another terminal (named Tc hereinafter) transmits an outgoing call to Ta. FIG. 4 shows the first embodiment according to the present invention. Firstly, a step 101 judges whether or not Ta is communicating with Tb. If the step 101 judges NO, the procedure is transferred to a known procedure.

If the step 101 judges YES, a step 102 judges whether or not the bearer capability of the SETUP includes the 3.1 kHz audio which indicates that the Tc is a G3 FAX. If the step 102 judges NO, a step 103 ignores an incoming call because Tc is not the G3 FAX. Consequently, the call procedure ends so that Ta is set in an awaiting state.

If the step 102 judges YES, a step 104 executes the call establishment procedure by which an idle B-channel is selected as a communication path between Ta and Tc. Then, the communication with Tc is delayed by a step 105 until the communication with Tb prior to Tc is finished. In this case, Tc is set in a reservation state for a time T1. The time T1 is, for example, approximately 30 seconds. If the communication with the Tb does not finish within the time T1, the call established between Ta and Tc is disestablished.

After the call concerning the communication with Tb is disestablished, a step 106 switches by means of the layer 1 signal controller 12 from one of the B-channels which is used for the communication with Tb to another of the B-channels which has been in a reservation state Since Ta is connected to Tc in the reservation state, a step 107 executes an image data transmission procedure, and then a step 108 executes a disestablishment procedure to disestablish the call between Ta and Tc.

Thus, according to the first embodiment of the present invention, Ta communicating with Tb sets Tc in a reservation state until the communication with Tb is finished, then, Ta is connected to Tc. Therefore, the outgoing call from Tc will never be unnecessarily repeated.

In the above embodiment, whether Tc is a G3 FAX is judged based on the presence of the 3.1 kHz audio included in the bearer capability of the SETUP. But there is a case in which Tc, which is not a G3 FAX, has the bearer capability with the 3.1 kHz audio. In that case, adequate image data cannot be transmitted. Accordingly, it is preferable to alert an operator, and telephone the operator by means of the handset 18 so as to confirm Tc is the G3 FAX.

Figure 5:
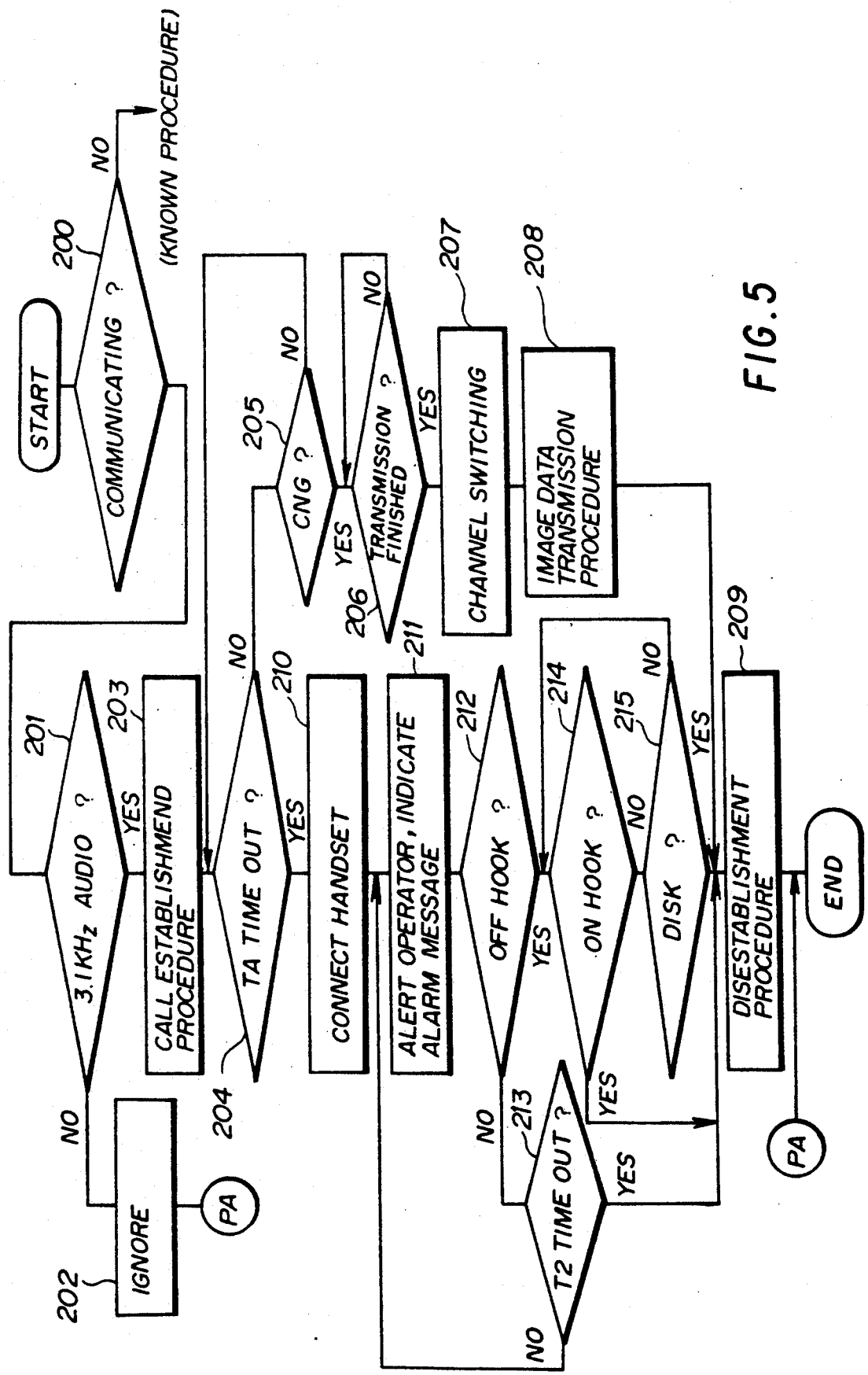
FIG. 5 shows a procedure executed by a controller of a second embodiment according to the present invention.

A description will now be given of a procedure of the controller 1 in the above case with reference to FIG. 5. At first, a step 200 judges whether or not Ta is communicating with Tb. If the step 200 judges NO, the procedure is transferred to the known procedure. If the step 200 judges YES, a step 201 judges whether or not the bearer capability of the SETUP includes the 3.1 kHz audio. If the step 201 judges NO, a step 202 ignores the incoming call. Consequently, the call procedure ends, and the Ta is set in the awaiting state. If the step 201 judges YES, a step 203 executes the call establishment procedure by which an idle B-channel is selected as a communication path.

Next, a loop composed of steps 204 and 205 judges whether or not a CNG is transmitted from Tc to Ta within a predetermined time TA. The CNG is absolutely transmitted from a G3 FAX in a G3 FAX procedure. If the Tc transmits the CNG to Ta so that the step 205 judges YES, then the communication with Tc is delayed until the present communication with Tb is finished by a step 206. After the call concerning the present communication is disestablished and thus the step 206 judges YES, a step 207 switches from one of the B-channels which is used for the communication with Tb to the other of the B-channels which has been in a reservation state. Since Ta is connected to Tc in a reservation state, a step 208 executes an image data transmission procedure, and thus a step 209 executes a disestablishment procedure to disestablish the call between Ta and Tc.

On the other hand, if Tc is not the G3 FAX, since the signal CNG is not transmitted from Tc in the time TA so that the step 204 judges YES, then a step 210 connects the handset 18 to the established B-channel. Subsequently, a step 211 alerts an operator by means of an operator calling tone via the CODEC 14 and the speaker 19 in order to indicate an alarm message "CONNECTED TO APPARATUS EXCEPT FAX" on the operation indicator 7. The operator may pick up the handset 18 to set Ta in a off hook state, or a loop composed of steps 212 and 213 establishes the call to wait for a predetermined time T2. If the operator picks up the handset 18 so that the step 212 judges YES, one of the operators may set Ta in the on hook state to wait for the DISK via a loop composed of steps 214 and 215. If one of the steps 214 and 215 judges YES, the procedure is transferred to a step 209 so as to execute the disestablishment procedure. If the operator has not picked up the handset 18 until t he step 213 judges the time T2 has passed, then the procedure is transferred to the step 209 so as to execute the disestablishment procedure.

Figure 6:
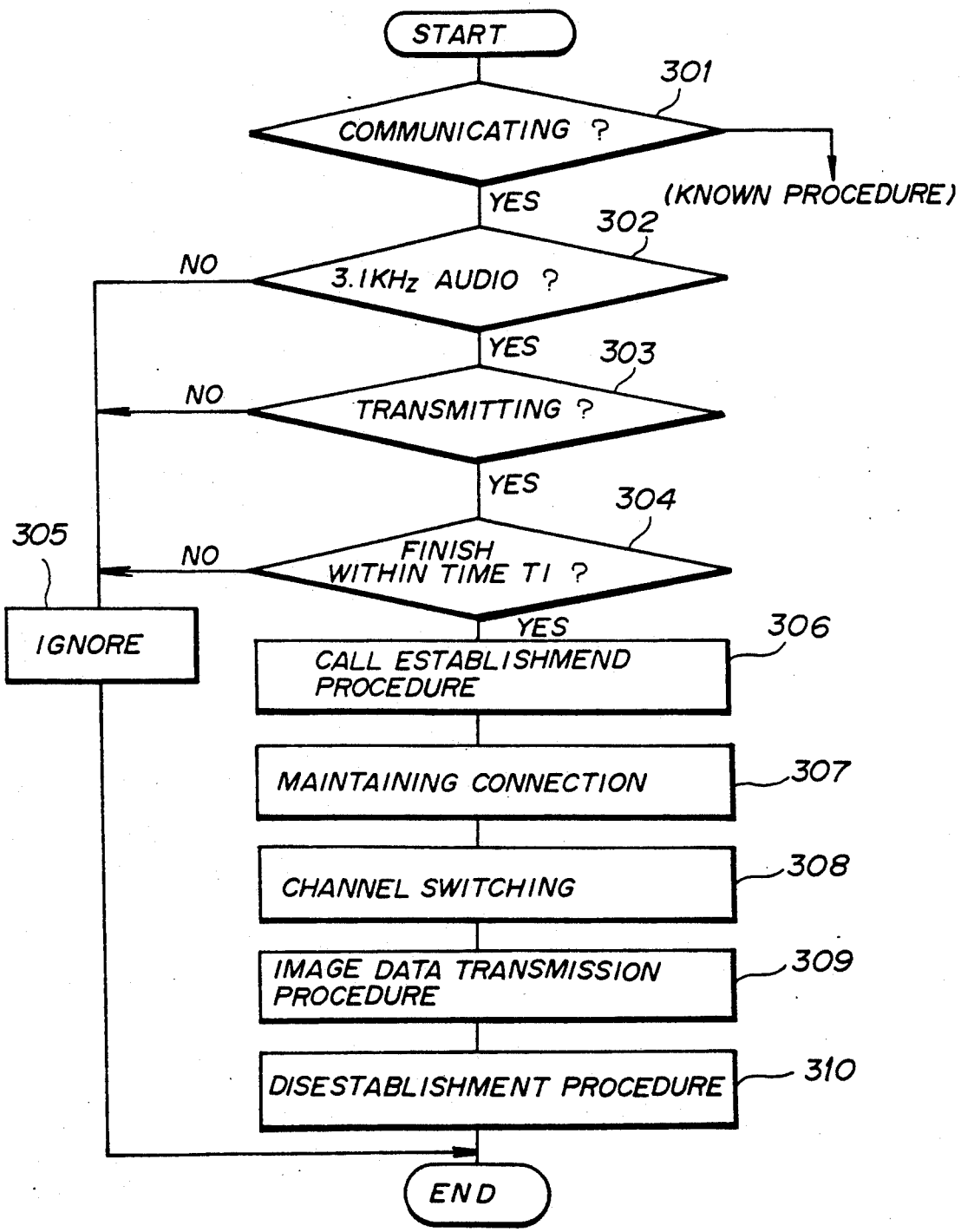
FIG. 6 shows a procedure executed by a controller of a third embodiment according to the present invention.

However, if the time T1 has passed from the time when Tc is set in the reservation state so that the call between Ta and Tc has been disestablished, Tc often judges that something is wrong with Ta to communicate therewith. Consequently, Tc may stop transmitting a re-outgoing call to Ta. FIG. 6 shows a procedure of the controller 1 which solves the above problem. In this embodiment, the communication path between Ta and Tc is set only when the controller 1 judges the image data transmission between Ta and Tb has finished within a time T1 from the time when the communication path therebetween was set.

At first, a step 301 judges whether or not Ta is communicating with Tb. If the step 301 judges NO, the procedure is transferred to the known procedure. If the step 301 judges YES, a step 302 judges whether or not the bearer capability of the SETUP includes the 3.1 kHz audio. If the step 302 judges NO, a step 303 judges whether or not predetermined image data is being transmitted between Ta and Tb. If the step 303 judges YES, a step 304 judges whether or not the data transmission will be finished within the time T1. The step 304 may judge by means of comparing the time T1 to an average transmission time per one page multiplied by remaining pages of the image data to be transmitted. If one of the steps 302 to 304 judges NO, a step 305 ignores the incoming call. Consequently, the procedure ends, and Ta is set in the awaiting state. If the step 304 judges YES, a step 306 executes the call establishment procedure by which an idle B-channel is selected as a communication path between Ta and Tc. Then, the communication with Tc is delayed by a step 307 until the communication with Tb is finished. After the call concerning the communication with Tb is disestablished, a step 308 switches by means of the layer 1 signal controller 12 from one of the B-channels which is used for the communication with Tb to the other of the B-channels which has been set in a reservation state. Since Ta is connected to Tc in a reservation state, a step 309 executes an image data transmission procedure, and then a step 310 executes the disestablishment procedure to disestablish the call concerning Ta and Tc.

Figure 7:
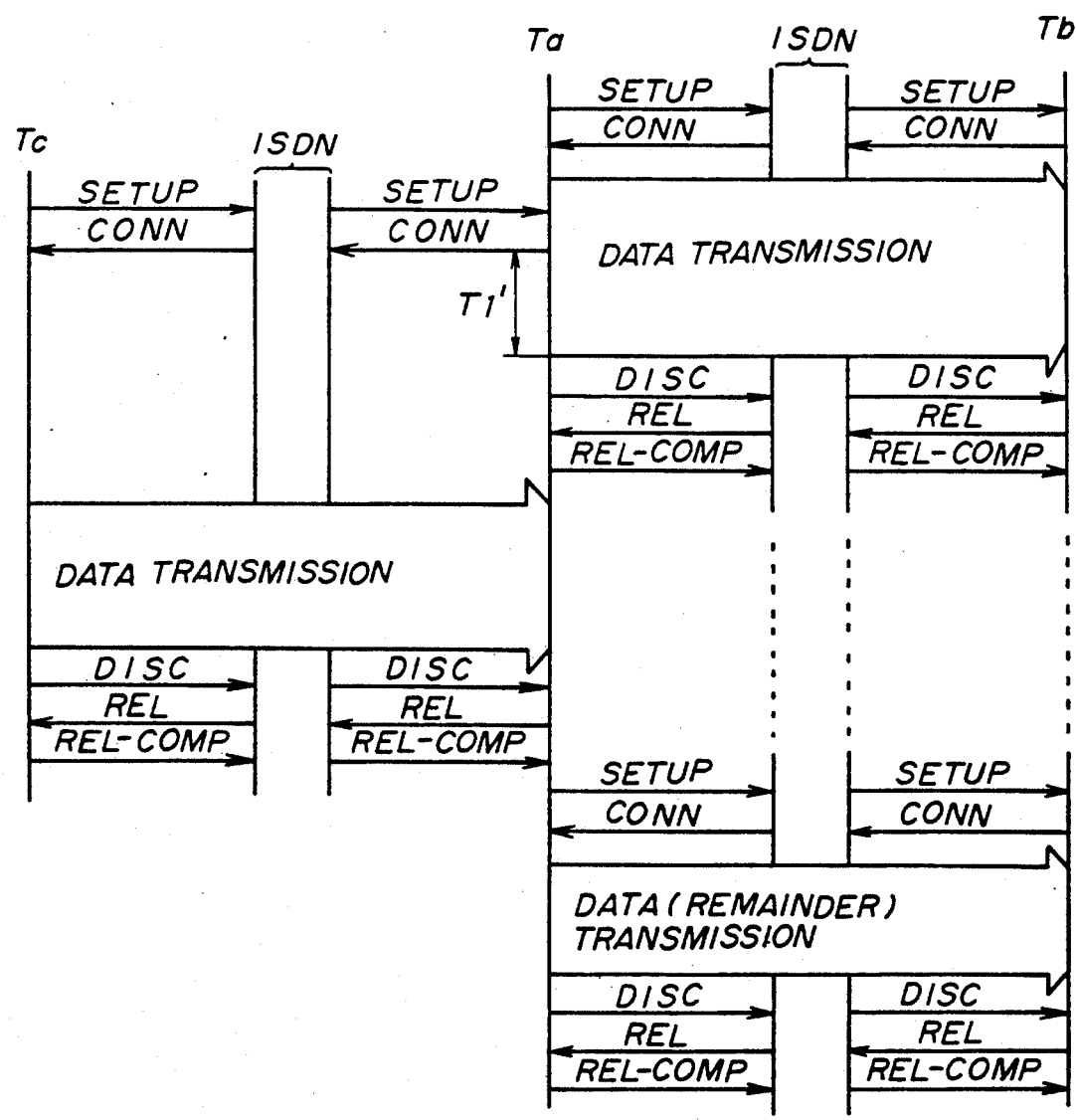
FIG. 7 shows a time chart for explaining a circuit-switched connection control procedure of a fourth embodiment according to the present invention.
Figure 8:
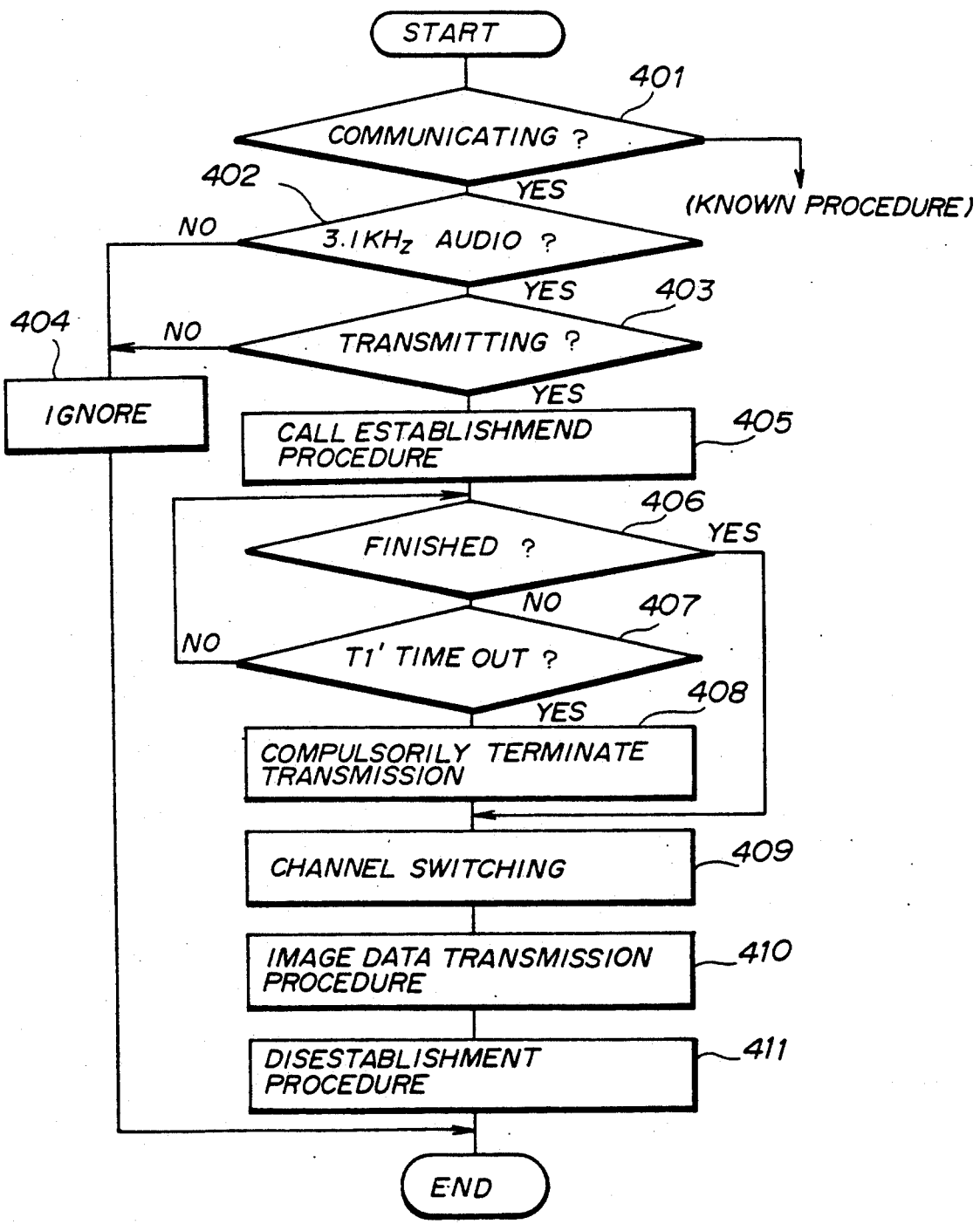
FIG. 8 shows a procedure executed by a controller in accordance with the time chart shown in FIG. 7.

FIG. 7 shows a time chart for explaining a circuit-switched connection control procedure of a fourth embodiment according to the present invention. In this embodiment, the controller 1 compulsorily terminates image data transmission being executed between Ta and Tb just after a predetermined time T1′ from the time when Tc has been set in a reservation state. Ta transmits a re-outgoing call to Tb after communication with Tc. The time T1′ is set to be slightly shorter than the time T1. Ta may memorize an ISDN number of Tb and the remaining page numbers for the subsequent re-communication with Tb. After the above termination, Ta executes the image data transmission procedure with Tc. Subsequent to the procedure, Ta transmits the re-outgoing call to Tb so as to transmit the remainder of the data thereto. The embodiment can be applied to the case in which image data is transmitted from Ta to Tb. FIG. 8 shows a procedure of the controller 1 in that case.

First, a step 401 judges whether or not Ta is communicating with Tb. If the step 401 judges NO, the procedure is transferred to the known procedure. If the step 401 judges YES, a step 402 judges whether or not the bearer capability of the SETUP includes the 3.1 kHz audio. If the step 402 judges NO, a step 403 judges whether or not predetermined data is being transmitted from Ta to Tb. If either of the steps 402 and 403 judges NO, a step 404 ignores the incoming call. Consequently, the call procedure ends, and Ta is set in the awaiting state. If the step 403 judges YES, a step 405 executes the call establishment procedure by which an idle B-channel is selected as a communication path between Ta and Tc. Then, the ending of the communication with Tb, or the passing of the time T1′, is judged by means of a loop composed of steps 406 and 407. If the time T1′ has elapsed so that the step 407 judges YES, then a step 408 compulsorily terminates the communication with Tb. Subsequently, a step 409 switches by means of the layer 1 signal controller 12 from the one of the B-channels which is used for the communication with Tb to the other of the B-channels which has been set in a reservation state. Since Ta is connected to Tc in a reservation state, a step 410 executes the image data transmission procedure, and then a step 411 executes the disestablishment procedure to disestablish the call therebetween. Subsequently, Ta transmits the re-outgoing call to Tb in order to transmit the remainder of the data.

Figure 9:
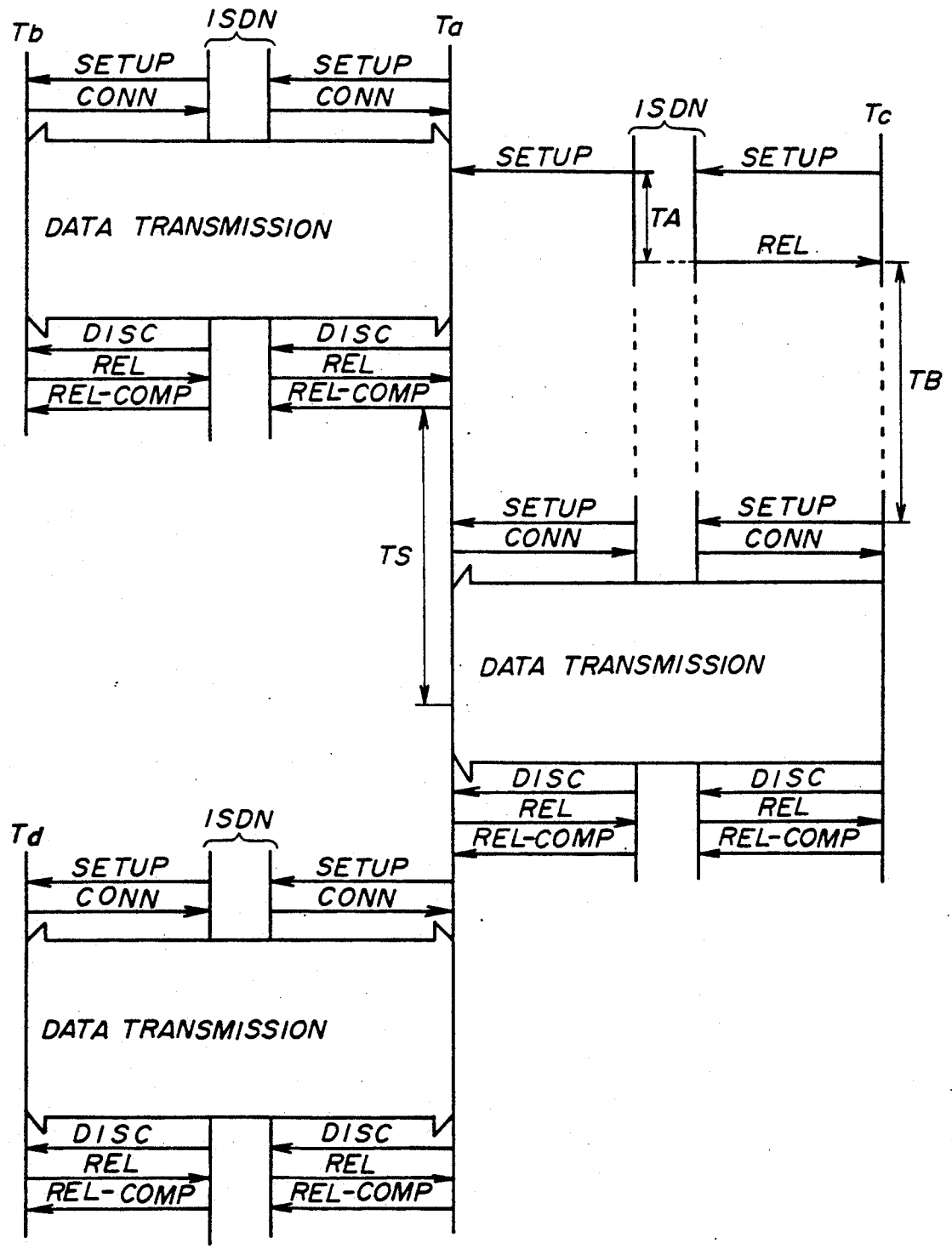
FIG. 9 shows a time chart for explaining a circuit-switched connection control procedure of a fifth embodiment according to the present invention.
Figure 10:
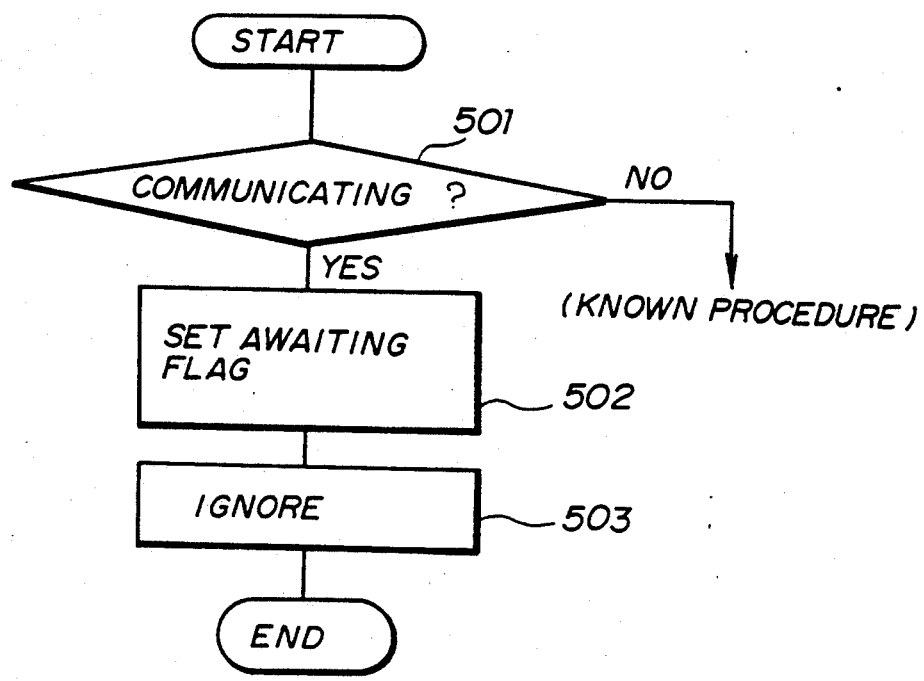
FIGS. 10 and 11 show procedures executed by a controller in accordance with the time chart shown in FIG. 9.

If Tc is a G4 FAX, Tc cannot be set in the reservation state. FIG. 9 shows a time chart for explaining a circuit-switched connection control procedure of a fifth embodiment. In this embodiment, if Tc, which is a G4 FAX, transmits an outgoing call to Ta which is communicating with Tb, the controller 1 sets Ta in the awaiting state after the communication with Tb to easily accept a re-incoming call from Tc. When Tc transmits the outgoing call to Ta while predetermined data is being transmitted between Ta and Tb, Ta ignores an incoming call based on the outgoing call from Tc. Since the ISDN cannot obtain a CONN from Ta within a predetermined time TA from the time when the ISDN has transmitted a SETUP thereto, the ISDN transmits a REL to Tc to inform Tc that Ta has not responded. Then the call is disestablished. In response to the REL, Tc transmits the SETUP, indicating a re-outgoing call, to Ta after a predetermined time Tb has passed. On the other hand, the controller 1 compulsorily sets Ta in the awaiting state for an awaiting time TS after the communication with Tb even if Ta is supposed to sequentially communicate with another terminal Td. If Tc transmits the re-outgoing call to Ta which has been set in the awaiting state, Ta accepts the incoming call. Consequently, image data are transmitted from Ta to Tc. FIG. 10 shows a procedure of the controller 1 in this above case. At first, a step 501 judges whether or not Ta is communicating with Tb. If the step 501 judges NO, the procedure is transferred to the known procedure. If the step 501 judges YES, a step 502 sets an awaiting flag, and a step 203 ignores an incoming call. Then the procedure ends.

Figure 11:
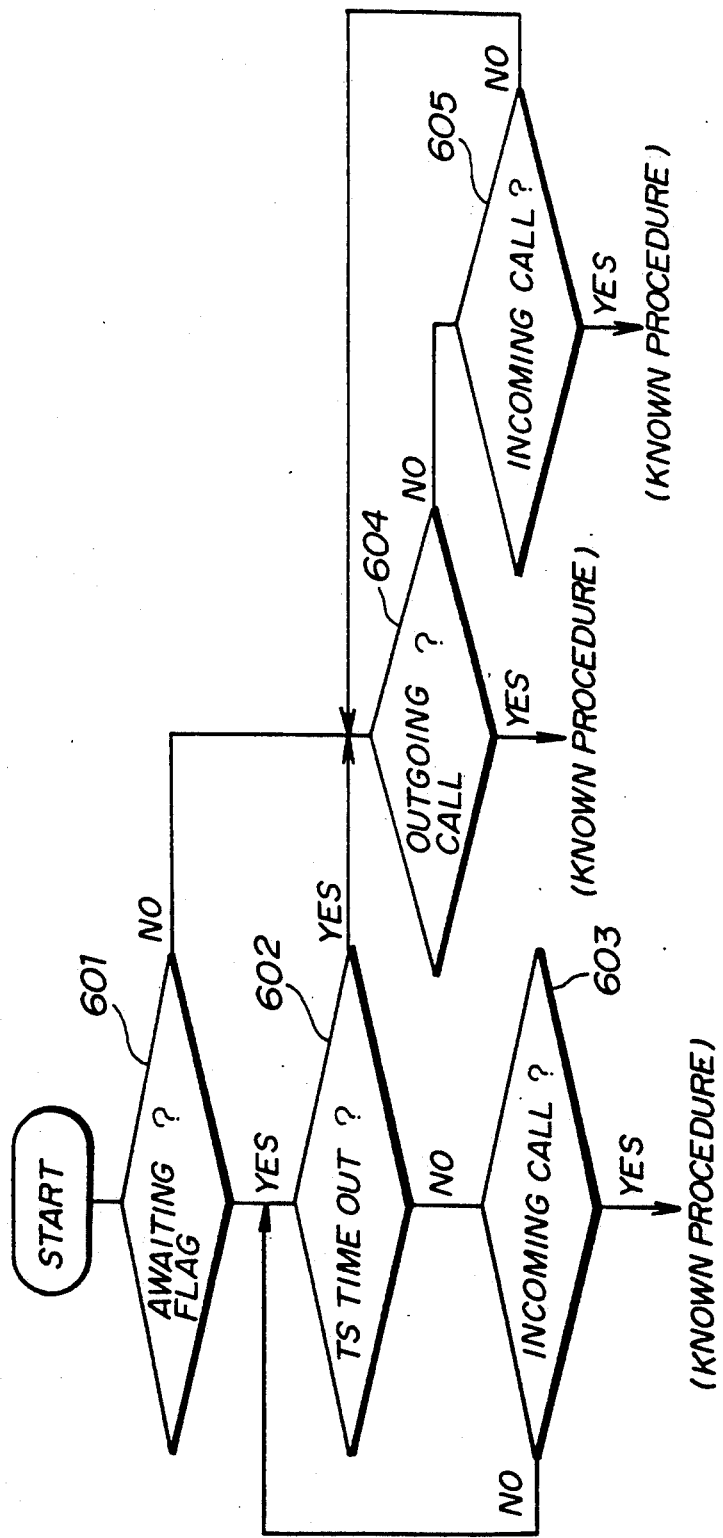

FIG. 11 shows a procedure of the controller 1 while Ta is in the awaiting state. First, a step 601 judges whether or not the awaiting flag has been set. If the step 601 judges YES, the passing of the awaiting time TS, or the presence of the incoming call, is judged by a loop composed of steps 602 and 603. If the step 603 judges YES, the procedure is transferred to the known call establishment procedure in which Ta accepts an incoming call from a predetermined terminal. If the step 601 judges the awaiting flag has not been set, or if the step 602 judges the awaiting time has elapsed, a step 604 judges whether or not Ta has transmitted an outgoing call to a predetermined terminal. If the step 604 judges NO, a step 605 judges the presence of the incoming call. If the step 605 judges NO, the procedure is transferred to the step 604. If the step 604 judges YES, the procedure is transferred to a known call establishment procedure in which Ta transmits an outgoing call to a predetermined terminal. If the step 605 judges YES, the procedure is transferred to a known call establishment procedure in which Ta accepts an incoming call from a predetermined terminal.

Figure 12:
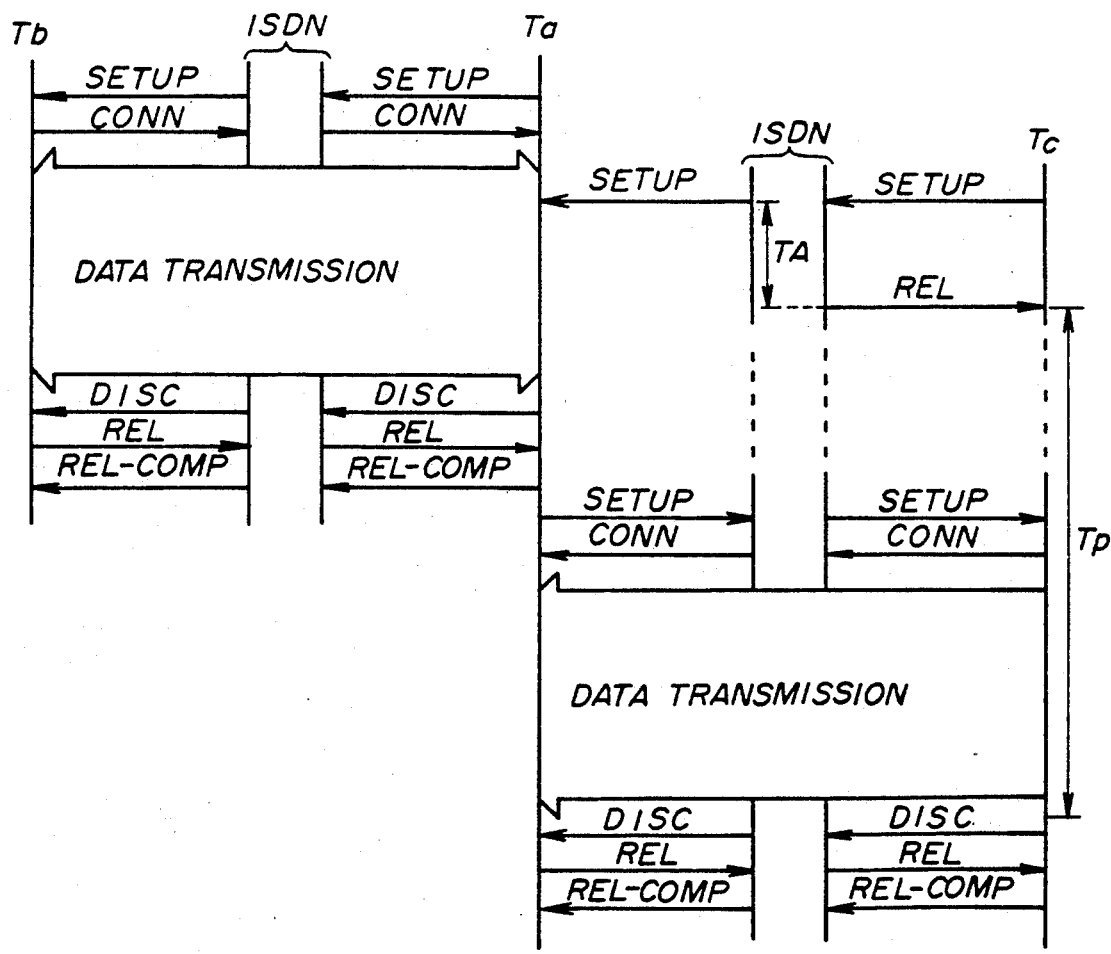
FIG. 12 shows a time chart for explaining a circuit-switched connection control procedure of a sixth embodiment according to the present invention.

FIG. 12 shows a time chart for explaining a circuit-switched connection control procedure of a sixth embodiment according to the present invention. In the fifth embodiment in FIG. 9, Ta waits for a re-outgoing call from Tc, however, in this embodiment, Ta positively transmits an outgoing call to Tc so as to receive image data therefrom. When Tc transmits an outgoing call to Ta communicating with Tb, Ta memorizes an ISDN number of Tc, which is set in a calling party number, and then ignores an incoming call therefrom. Since the ISDN cannot obtain a CONN from Ta within a predetermined time TA since the ISDN transmits a SETUP thereto, the ISDN transmits a REL to Tc, and thus the call is disestablished. Subsequently, Tc makes itself in a polling transmission awaiting mode for a predetermined time $T_p$ when Tc has received the REL. From this point, Tc in the embodiment is a part of the present invention. Tc in the polling transmission awaiting mode is supposed to transmit the image data to Ta in response to a predetermined outgoing call from Ta. The term "polling", as used herein, means that a calling terminal receives image data from a called terminal. On the other hand, Ta transmits Tc the predetermined outgoing call by using the ISDN number of the Tc stored therein after the communication with Tb. After a communication path between Ta and Tc is established, Ta executes a polling transmission receipt so that image data is transmitted from Tc to Ta. FIG. 13 shows a procedure executed by the controller 1 when Tc transmits the outgoing call to Ta which is communicating with Tb.

At first, a step 701 judges whether or not Ta is communicating with Tb. If the step 701 judges NO, the procedure is transferred to the known procedure. If the step 701 judges YES, a step 702 judges whether or not a function Ta corresponds to that of Tc. As mentioned above, the step 702 judges by means of the 3.1 kHz audio which indicates that Tc is a G3 FAX, or the unrestricted digital which indicates that Tc is a G4 FAX, based on the SETUP. If the step 702 judges YES, a step 703 judges a calling party number is included in the SETUP. If the step 703 judges YES, a step 704 memorizes an ISDN number in the calling party number, and sets Ta in the polling receipt mode. Subsequently, a step 805 ignores an incoming call from Tc. Even if either of the steps 702 and 703 judges NO, the procedure is transferred to the step 705.

Figure 14:
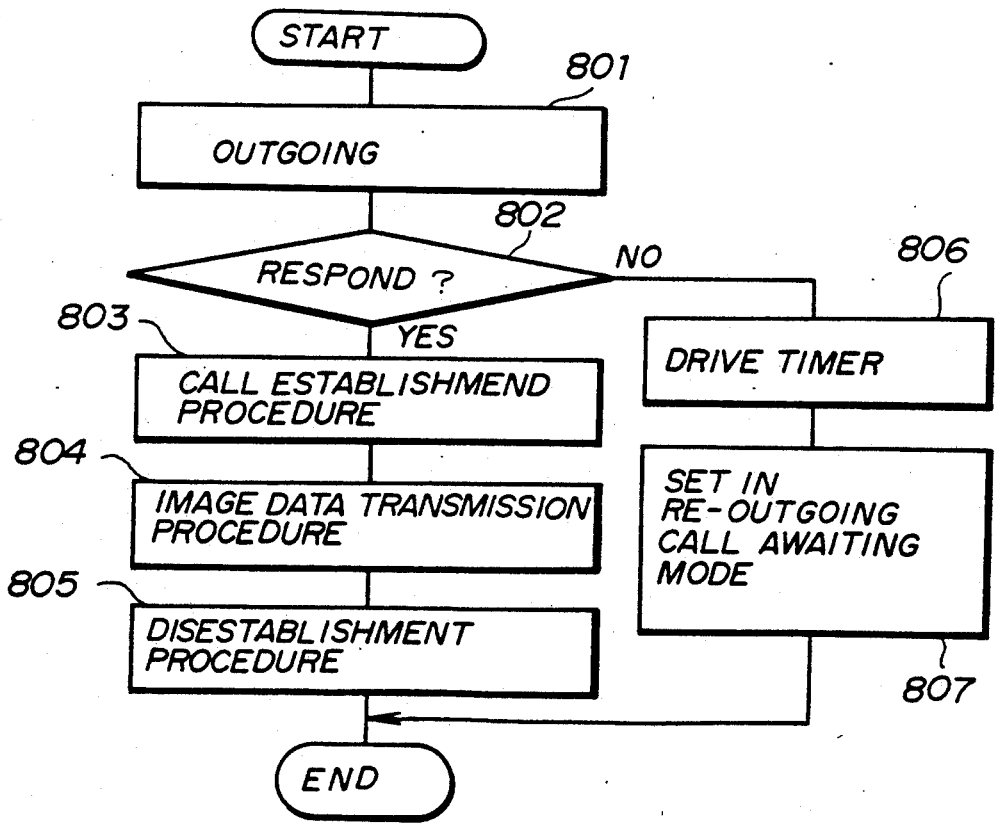

After the communication between Ta and Tb is finished, the controller 1 execute a procedure shown in FIG. 14 so as to communicate with Tc. At first, a step 801 transmits an outgoing call to Tc so that a step 802 judges whether or not Tc responds. If the step 802 judges YES, a step 803 establishes a communication path between Ta and Tc so that a step 804 executes the image data transmission procedure. As mentioned above, in this embodiment, Tc has set itself in the polling transmission awaiting mode from the time when the incoming call thereof has been ignored by Ta. Therefore, the image data is transmitted from Tc to Ta. After this data transmission, a step 805 executes a disestablishment procedure. If Tc is communicating with still another terminal when Ta transmits the outgoing to Tc so that the step 802 judges NO, a step 806 drives a timer which clocks a polling awaiting time $T_p$, and a step 807 sets Ta in a re-outgoing call awaiting mode so as to transmit the re-outgoing call to Tc.

Figure 15:
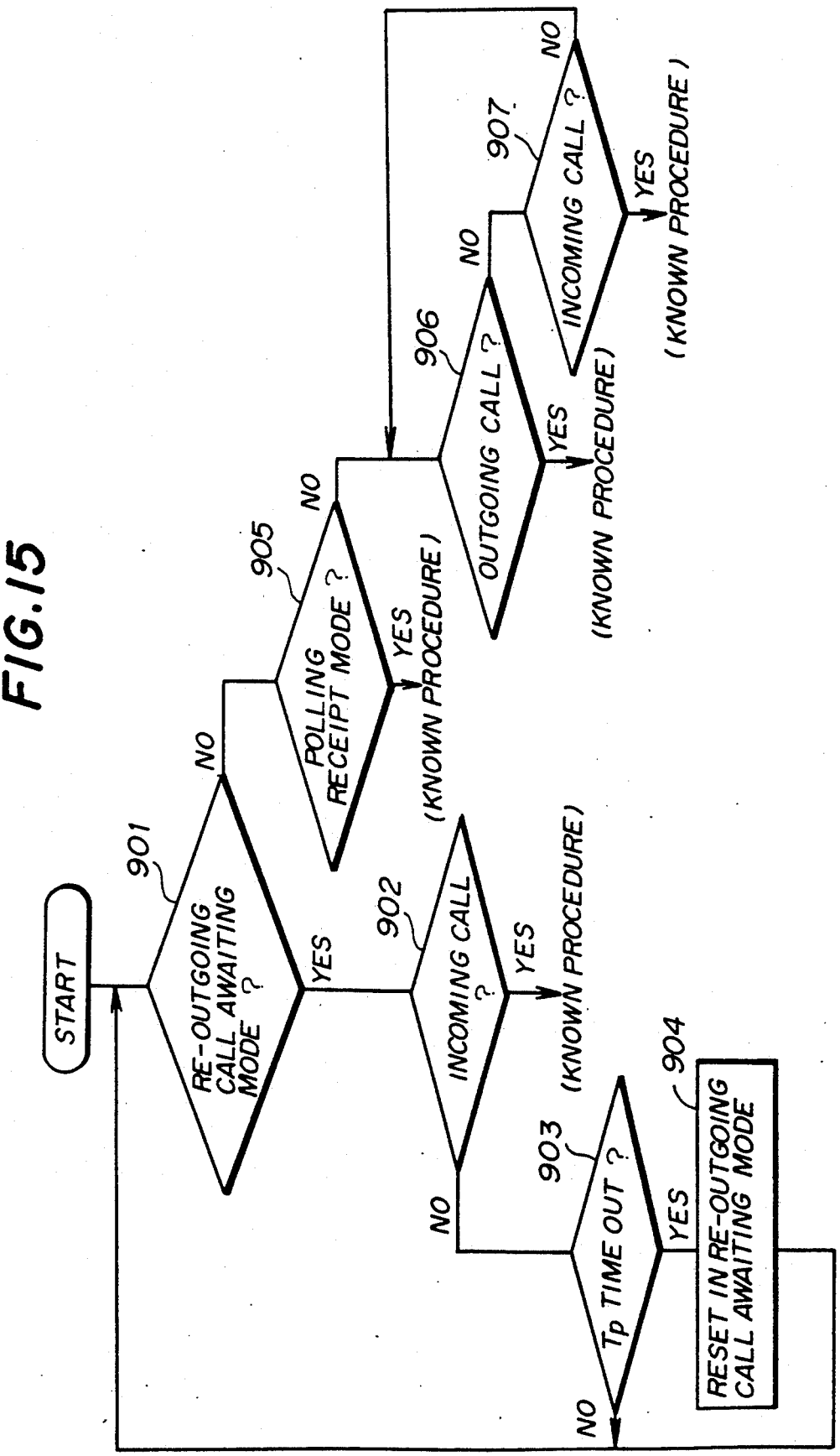

If the procedure shown in FIG. 14 is flown from the step 802 to the step 807 so that Ta has not received the image data from Tc and both B-channels are idle, then the controller 1 executes a procedure shown in FIG. 15. At first, a step 901 judges whether or not Ta is set in the re-outgoing call awaiting mode. If the step 901 judges YES, a step 902 judges whether or not an incoming call is transmitted to Ta. If the step 902 judges NO, a step 903 judges whether or not the timer clocks the time $T_p$. If the step 903 judges NO, then the procedure is transferred to the step 901. If the step 902 judges YES, the procedure is transferred to the known call establishment procedure in which Ta accepts an incoming call from a predetermined terminal. If the step 903 judges YES, a step 904 resets Ta in the polling re-outgoing call awaiting mode to execute the procedure composed of the steps 801 to 805 shown in FIG. 13, and then the procedure is transferred to the step 901. On the other hand, if the step 901 judges NO, a step 905 judges whether or not the polling receipt mode is set to Ta. If the step 905 judges YES, the procedure is transferred to the known call establishment procedure in which Ta transmits a predetermined terminal an outgoing call. If the step 905 judges NO, a step 906 judges whether or not Ta is supposed to transmit data. If the step 906 judges YES, the procedure is transferred to the known call establishment procedure in which Ta transmits an outgoing call to a predetermined terminal. If the step 906 judges NO, a step judges whether or not Tc has transmitted an incoming call. If the step 907 judges YES, the procedure is transferred to the known call establishment procedure in which Ta accepts an incoming call from a predetermined terminal. However, if the step 907 judges NO, the procedure is transferred to the step 906. Image data are transmitted repeatedly if the polling transmission awaiting mode is reset to Ta.

Needless to say, the present invention is applicable to a G3 FAX used for the ISDN.

Further, the present invention is not limited to these preferred embodiments, but various variations and modifications may be made without departing from the scope of the present invention.

What is claimed is:

1. A facsimile apparatus for transmitting information to an external apparatus and/or receiving information therefrom via a transmission line, the information comprising first information and second information, the first information comprising image data, the second information comprising control information by which said facsimile apparatus is connected with the external apparatus, the transmission line comprising a plurality of first channels through one of which the first information is transmitted, and at least one second channel through which the second information is transmitted, each of the first channels being connectable to said facsimile apparatus and/or the external apparatus, the first information being incapable of being transmitted simultaneously via more than two channels from among the first channels between said facsimile apparatus and the external apparatus, however more than two channels therefrom being simultaneously connectable to said facsimile apparatus and the external apparatus, and the second channel being operatively connectable to said facsimile apparatus and/or the external apparatus, said facsimile apparatus comprising:

scanning means for scanning a predetermined manuscript so as to generate the image data appropriate to the predetermined manuscript;

an interface operatively connectable to the transmission line;

memory, responsive to said scanning means and interface, for storing the first information therein;

first control means, coupled to said interface and memory, for controlling transmitting and/or receiving of the first information via one of the first channels;

second control means, coupled to said interface, for controlling transmitting and/or receiving of the second information via the second channel;

third control means, responsive to said first and second control means, for controlling said first and second control means, said third control means including;

first judging means for judging whether or not the first information is being transmitted between said facsimile apparatus and a first external apparatus when said second control means receives the second information from a second external apparatus, and processing means, responsive to the first judging means, for processing the second information from the second external apparatus by means of correlating the first external apparatus with the second external apparatus so that the second external apparatus is prevented from frequently transmitting the second information to said facsimile apparatus, the processing means processing only if the first judging means judges the first information is being transmitted between said facsimile apparatus and the first external apparatus, and plotter means, responsive to the second control means, for plotting an image appropriate to image information which the first control means receives from the external apparatus.

2. The facsimile apparatus according to claim 1, wherein said facsimile apparatus further comprises connection control means, coupled to said interface, for operatively connecting said interface to the transmission line and/or disconnecting said interface therefrom.

3. The facsimile apparatus according to claim 2, wherein said third control means further comprises selection means, which operates only if said facsimile apparatus is connected to a plurality of external apparatuses via a corresponding plurality of first channels which are operatively connected by said connection control means, for selecting a predetermined first channel from among the corresponding plurality of first channels in order to transmit the first information therethrough.

4. The facsimile apparatus according to claim 3, wherein said facsimile apparatus is functionable as a group 3 facsimile apparatus, and the processing means further comprises second judging means, coupled respectively to said second control means, for judging whether or not the second external apparatus is functionable as a group 3 facsimile apparatus based on the second information, the processing means instructing said first control means to receive the first information from the second external apparatus if the second judging means has judged the second external apparatus is functionable as the group 3 facsimile apparatus, and the processing means ignoring the second information from the external apparatus if the second judging means has judged the second external apparatus is not functionable as the group 3 facsimile apparatus.

5. The facsimile apparatus according to claim 4, wherein the processing means further comprises:

call establishment means, coupled to the second judging means, for instructing said connection control means to connect said interface to one of the first channels which has been operatively connected to the second external apparatus if the second judging means has judged the second external apparatus is functionable as the group 3 facsimile apparatus;

reservation means, responsive to the call establishment means, for maintaining the connection of the one of the first channels between said facsimile apparatus and the second external apparatus;

selection control means, coupled to said reservation means, for instructing the selection means to select the one of the first channels after the transmission of the first information between said facsimile apparatus and the first external apparatus is finished;

first transmission control means, responsive to the selection control means, for instructing the first control means to receive the first information from the second external apparatus after the selection means has selected the one of the first channels;

disestablishment means, responsive to the first transmission control means, for instructing the connection control means to disconnect said interface from the one of the first channels after said first control means has received the first information from the second external apparatus; and ignoring means, responsive to the second judging means, for ignoring the second information from the second external apparatus if the second judging means has judged the second external apparatus is not functionable as the group 3 facsimile apparatus.

6. The facsimile apparatus according to claim 5, wherein said processing means further comprises alarm indicating means, coupled to the call establishment means and reservation means, for indicating that the second external apparatus is not a facsimile apparatus only if the first information is not transmitted from the second external apparatus to said facsimile apparatus within a first time period from the time when the call establishment means has instructed said connection means.

7. The facsimile apparatus according to claim 6, wherein said facsimile apparatus further comprises a handset, operatively connected to said interface, by which a first operator of said facsimile apparatus can communicate with a second operator of the external apparatus via the one of the first information channels, and wherein the processing means further comprises handset control means for instructing the connection control means connecting said handset to the one of the first channels which has been operatively connected to the second external apparatus, so that the first operator can communicate with the second operator if the first information is not transmitted from the second external apparatus to said facsimile apparatus within the first time period when the second instruction means has instructed the selection means.

8. The facsimile apparatus according to claim 5, wherein the processing means further comprises third judging means, coupled respectively to the call establishment means and ignoring means, for judging whether or not the transmission of the first information from said facsimile apparatus to the first external apparatus will be finished within a second time period from the time when the first judging means judges the first information is being transmitted from said facsimile apparatus to the first external apparatus, the call establishment instructing said connection control means if the third judging means has judged the transmission of the first information from said facsimile apparatus to the first external apparatus will be finished, and the ignoring means ignoring the second information from the second external apparatus if the third judging means has judged the transmission of the first information from said facsimile apparatus to the first external apparatus will not be finished.

9. The facsimile apparatus according to claim 8, wherein the second external apparatus is operatively disconnected from said facsimile apparatus if the selection means has not selected the one of the first channels within the second time period from the time when the connection control means has connected said facsimile apparatus to the one of the first channels.

10. The facsimile apparatus according to claim 8, wherein the processing means further comprises transmission judging means, coupled to the third judging means and ignoring means, for judging whether or not the facsimile apparatus is transmitting the first information to the first external apparatus when the second information is transmitted from the second external apparatus to said facsimile apparatus, the ignoring means ignoring the second information from the second terminal if the transmission judging means has judged the first information has not been transmitted from said facsimile apparatus to the first external apparatus.

11. The facsimile apparatus according to claim 3, wherein the processing means further comprises:
call establishment means for instructing said connection control means to connect said interface to one of the first channels which has been operatively connected to the second external apparatus;
fourth judging means for judging whether or not the transmission of the first information from said facsimile apparatus to the first external apparatus is finished within a third time period from the time when the first judging means judges the first information is being transmitted from said facsimile apparatus to the first external apparatus;
transmission terminating means, coupled respectively to said first control means and the call establishment means, and fourth judging means, for instructing said first control means to compulsorily terminate the transmission of the first information from said facsimile apparatus to the first external apparatus if the fourth judging means has judged the transmission of the first information from said facsimile apparatus to the first external apparatus has not been finished;
selection control means, responsive to the transmission terminating means, for instructing the selection means to select the one of the first channels after the transmission has instructed said first control means;
first transmission control means, responsive to the selection control means, for instructing the first control means to receive the first information from the second external apparatus after the selection means has selected the one of the first channels; and
disestablishment means, responsive to the first transmission control means, for instructing the connection control means to disconnect said interface from the one of the first channels after said first control means has received the first information from the second external apparatus.

12. The facsimile apparatus according to claim 11, wherein the second external apparatus is operatively disconnected from said facsimile apparatus if the selection means has not selected the one of the first channels within the second time period from the time when the connection control means has connected said facsimile apparatus to the one of the first channels, the third time period being shorter than the second time period.

13. The facsimile apparatus according to claim 11, wherein the processing means further comprises:
transmission judging means for judging whether or not the facsimile apparatus is transmitting the first information to the first external apparatus when the second information is transmitted from the second external apparatus to said facsimile apparatus; and
ignoring means, responsive to the transmission judging means, for ignoring the second information from the second external apparatus when the first information is not transmitted from said facsimile apparatus to the first external apparatus.

14. The facsimile apparatus according to claim 11, wherein said processing means further comprises remainder transmission means for instructing said second control means to transmit the second information to the first external apparatus in order to transmit a remainder of the first information from said facsimile apparatus to the first external apparatus, the remainder being transmitted in the transmission of the first information from said facsimile apparatus to the first external apparatus prior to the transmission of the second information from the second external apparatus.

15. The facsimile apparatus according to claim 3, wherein the processing means further comprises:
awaiting flag setting means for setting an awaiting flag;
awaiting flag confirming means for judging whether or not the awaiting flag setting means has set the awaiting flag;
fifth judging means for judging whether or not the second information transmitted from the second external apparatus to said second control means is transmitted within a fifth time period from the time when the transmission of the first information between said facsimile apparatus and the first external apparatus has been finished;
call establishment means, responsive to the fifth judging means, for instructing said connection control means to operatively connect said interface to the second external apparatus if the seventh judging means has judged the second information from the second external apparatus has been transmitted; and
selection control means, responsive to the call establishment means, for instructing the selection means to select one of the first channels which has been operatively connected to the second external apparatus, so that the first information can be transmitted from the second external apparatus to said facsimile apparatus subsequent to the transmission of the first information between said facsimile apparatus and the second external apparatus.

16. The facsimile apparatus according to claim 1, wherein said facsimile apparatus is functionable as a group 3 facsimile apparatus and a group 4 facsimile apparatus, and
the processing means further comprises second judging means, coupled respectively to said second control means, the determining means and the processing means, for judging whether or not the external apparatus is functionable as a group 3 facsimile apparatus based on the second information, the processing means instructing said first control means to receive the first information from the second external apparatus if the second judging means has judged the second external apparatus is functionable as the group 3 facsimile apparatus, and the processing means ignoring the second information from the second external apparatus if the second judging means has judged the second external apparatus is not functionable as the group 3 facsimile apparatus.

17. The facsimile apparatus according to claim 16, wherein the transmission line comprises an integrated digital network, the plurality of the first channels comprising two B-channels, and the second channel comprising one D-channel.

18. The facsimile apparatus according to claim 11, wherein said facsimile apparatus is functionable as a group 3 facsimile apparatus and a group 4 facsimile apparatus, and
the second external apparatus is functionable as a group 4 facsimile apparatus.

19. The facsimile apparatus according to claim 1, wherein said facsimile apparatus is functionable as a group 3 facsimile apparatus and a group 4 facsimile apparatus, and
the processing means further comprises sixth judging means, coupled respectively to said second control means and the processing means, for judging whether or not the external apparatus is functionable as a group 4 facsimile apparatus based on the second information, the processing means instructing said first control means to receive the first information from the second external apparatus if the eighth judging means has judged the second external apparatus is not functionable as the group 4 facsimile apparatus, and the processing means ignoring the second information from the second external apparatus if the eighth judging means has judged the second external apparatus is not functionable as the group 4 facsimile apparatus.

20. The facsimile apparatus according to claim 3, wherein the processing means further comprises:
polling receipt mode setting means for setting said facsimile apparatus in a polling receipt mode, said facsimile apparatus being able to receive the first information from the external apparatus by means of transmitting the second information to the external apparatus when said facsimile apparatus is set in the polling receipt mode; and
second transmission control means, responsive to the polling receipt mode setting means, for instructing the second control means to transmit the second information to the second external apparatus in order to receive the first information from the second internal apparatus after the transmission of the first information between said facsimile apparatus and the first external apparatus.

21. The facsimile apparatus according to claim 1, wherein the processing means further comprises ID number detecting means, coupled to said second control means, for detecting an ID number which is supposed to be included in the second information from the second external apparatus, the ID number indicating an indemnification to the external apparatus, the processing means instructing said first control means to receive the first information from the second external apparatus if the ID number detecting means has detected the ID number of the second external apparatus, and the processing means ignoring the second information from the second external apparatus if the ID number detecting means cannot detect the ID number of the second external apparatus.

22. The facsimile apparatus according to claim 20, wherein said processing means further comprises polling receipt mode resetting means for resetting the facsimile apparatus in the polling receipt mode if the second external apparatus has not transmitted the first information to said facsimile apparatus even when second control means transmits the second information to the second external apparatus, said facsimile apparatus being reset in the polling receipt mode for a fifth time from the time when the second transmission control means has instructed said second control means, and the second transmission control means instructing the second control means to transmit the second information to the second external apparatus in order to receive the first information from the second external apparatus after said facsimile apparatus being reset in the polling receipt mode.

* * * * *